(12) United States Patent
Hobe

(10) Patent No.: US 10,004,108 B2
(45) Date of Patent: Jun. 19, 2018

(54) MANAGING BANDWIDTH AVAILABILITY IN A MOBILE TELECOMMUNICATIONS NETWORK

(71) Applicant: Telefonaktiebolaget L M Ericsson (publ), Stockholm (SE)

(72) Inventor: Martin Hobe, Budel Dorplein (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 151 days.

(21) Appl. No.: 14/890,623

(22) PCT Filed: Jun. 4, 2013

(86) PCT No.: PCT/EP2013/061494
§ 371 (c)(1),
(2) Date: Nov. 12, 2015

(87) PCT Pub. No.: WO2014/194936
PCT Pub. Date: Dec. 11, 2014

(65) Prior Publication Data
US 2016/0128133 A1    May 5, 2016

(51) Int. Cl.
*H04W 76/34* (2018.01)
*H04L 12/24* (2006.01)
(Continued)

(52) U.S. Cl.
CPC ......... *H04W 76/34* (2018.02); *H04L 41/0816* (2013.01); *H04L 41/0893* (2013.01); *H04M 15/41* (2013.01); *H04W 4/001* (2013.01); *H04W 4/50* (2018.02); *H04W 28/20* (2013.01); *H04W 76/041* (2013.01); *H04W 76/064* (2013.01); *H04W 76/22* (2018.02); *H04L 12/1482* (2013.01); *H04M 15/43* (2013.01); *H04M 15/60* (2013.01); *H04W 4/24* (2013.01); *H04W 8/20* (2013.01)

(58) Field of Classification Search
CPC ...... H04M 15/41; H04M 15/70; H04M 15/00; H04M 15/49; H04M 15/80; H04M 15/83; H04M 2215/22; H04M 2215/82; H04M 15/58; H04M 3/2218; H04W 4/24; H04W 4/26; H04W 8/18
See application file for complete search history.

(56) References Cited

U.S. PATENT DOCUMENTS

2007/0180061 A1    8/2007    Bantz et al.
2008/0075116 A1    3/2008    Holierhoek et al.
(Continued)

FOREIGN PATENT DOCUMENTS

WO    2009114923 A1    9/2009

*Primary Examiner* — Jung Park
(74) *Attorney, Agent, or Firm* — Coats & Bennett, PLLC

(57) ABSTRACT

A mobile wireless device for use with a mobile telecommunications network. The device comprises a controller unit for switching one or more mobile services on and off, and a user interface unit configured to receive user inputs indicating that a user wants to turn the one or more mobile services on or off and for causing the controller unit to act accordingly. The device further comprises a network signalling unit for identifying times at which the user switches the one or more mobile services on and off and for signalling those times to an entity within or connected to said mobile telecommunications network.

9 Claims, 13 Drawing Sheets

(51) Int. Cl.
*H04W 76/04* (2009.01)
*H04W 4/00* (2018.01)
*H04W 28/20* (2009.01)
*H04W 76/06* (2009.01)
*H04L 12/14* (2006.01)
*H04W 4/24* (2018.01)
*H04W 8/20* (2009.01)
*H04M 15/00* (2006.01)

(56) References Cited

U.S. PATENT DOCUMENTS

| | | | | |
|---|---|---|---|---|
| 2012/0004003 | A1* | 1/2012 | Shaheen | H04W 4/005 455/509 |
| 2013/0005320 | A1* | 1/2013 | Li | H04W 76/022 455/418 |
| 2013/0132854 | A1* | 5/2013 | Raleigh | G06F 3/0482 715/738 |
| 2013/0214909 | A1* | 8/2013 | Meijers | H04W 4/008 340/10.5 |

* cited by examiner

MANAGING BANDWIDTH AVAILABILITY IN A MOBILE TELECOMMUNICATIONS NETWORK

TECHNICAL FIELD

The present invention relates to managing bandwidth availability for subscribers in a mobile telecommunications network.

BACKGROUND

Since the introduction of data services in mobile telecommunications networks (referred to hereinafter, by way of example, as Public Land Mobile Networks, PLMNs), limited bandwidth has presented both operators and subscribers with significant problems. Whilst new network architectures and traffic optimisation schemes have greatly increased available bandwidth, these do not necessarily keep pace with the ever increasing demands of subscribers and data services. With the now ubiquitous smartphones and other data hungry devices, bandwidth consumption will only increase further.

Many user applications and services are in an "always-on" state such that devices are almost continuously consuming bandwidth even if at a relatively low level. Consider for example push email, social networks and the like. All of these services are pushing and pulling a steady stream of data to and from the PLMN. Aggregated across a large number of users (in a PLMN cell), the total impact on bandwidth usage can be significant and can be particularly problematic during busy periods and/or at geographic hotspots such as in the vicinity of a football stadium.

Currently the only practical way to completely eliminate bandwidth usage at a mobile device is for a subscriber to either switch off his or her phone or put the phone into a "flight mode" (closing all possible connections like data and phone usage). Whilst a subscriber might do this when he or she is being charged based upon data traffic, many subscribers these days are on bundle-based tariffs, or even unlimited data packages, so there is little or no incentive for the subscribers to switch off data services merely for the benefit of the network operator (and other subscribers). Some subscribers might not even appreciate that their devices are sending and receiving data in the background.

Similar bandwidth issues can arise in the case of non-data services including voice, i.e. at peak times and/or in "hotspot" areas network capacity can become overloaded resulting in poor service levels.

In the absence of a mechanism or service to actively reduce subscriber bandwidth consumption, PLMN operators must either subject subscribers to a reduced service level or install expensive additional network infrastructure.

SUMMARY

It is an object to obviate at least some of the above disadvantages and provide an improved mobile telecommunications network and terminal.

The present invention provides a mechanism whereby mobile network bandwidth can be selectively and dynamically released by or on behalf of subscribers. This is achieved at least in part by recording when subscribers make an active choice to switch on or off mobile services such as mobile data services. This information can be used by the network to provide e.g. enhanced services, to subscribers.

According to a first aspect of the present invention there is provided a mobile wireless device, also called wireless terminal or User Equipment (UE), for use with a mobile telecommunications network. The UE comprises a controller unit for switching one or more mobile services on and off, and a user interface unit configured to receive user inputs indicating that a user wants to turn the one or more mobile services on or off and for causing the controller unit to act accordingly. The UE further comprises a network signalling unit for identifying times at which the user switches the one or more mobile services on and off and for signalling those times to an entity within or connected to said mobile telecommunications network.

The mobile service(s) may include a mobile data service. The controller unit may be configured to switch a mobile data service on and off by activating and deactivating a Packet Data Protocol (PDP) context with the mobile telecommunications network.

The user interface unit may be a graphical user interface and said network signalling unit is configured to receive from said mobile telecommunications network a notification that a bandwidth release service is available. The controller unit is configured to respond to receipt of said notification by causing said graphical user interface to display user selectable options to turn mobile services on and off.

The UE may comprise a processor for causing the mobile device to participate in a subscriber group that is configured to share PLMN bandwidth, when said user interface has received a user input indicating that the user wants to turn mobile services off. The processor is responsive to subsequent network signalling to turn mobile services on and off at the UE, such that subscribers in the group take turns at using UE.

According to a second aspect of the present invention there is provided a method of operating a UE for use with a mobile telecommunications network. The method comprises receiving user inputs via a user interface indicating that a user wants to turn one or more mobile services on and off, and switching the one or more mobile services on and off in accordance with received user inputs. The method further comprises identifying times at which the user switches the one or more mobile data services on and off and signalling those times to an entity within or connected to said mobile telecommunications network.

According to a third aspect of the present invention there is provided a method of managing bandwidth availability in a mobile telecommunications network. The method comprises the steps of identifying periods of time during which subscribers have actively switched off one or more mobile services at their UEs, and providing a policy deployment towards subscribers in dependence upon the length and number of such periods.

The method may comprise, within the mobile telecommunications network, generating Call Detail (or Data) Records (CDRs) indicative of said policy deployment and providing the CDRs to a further network or network node, e.g part of an operator's network billing domain. The method may further comprise receiving at a network server from subscriber UEs, timestamps indicative of times at which mobile data services are turned on and off at the UEs, storing said timestamps, and using said timestamps to determine said periods.

The method may comprise sending from the mobile telecommunications network to the UEs alerts for identifying to the UEs, times and or locations within which said rewards are available. The active switching off of one or more mobile services may be carried out by a user in response to receipt of an alert from the mobile telecommunications network.

The method may comprise recording within the PLMN the subscribers that have elected to join a given subscriber group, only one of which subscribers uses said mobile services at any given time, and using said timestamps to police active participation in the group and to provide said rewards. The method may comprise managing the group in order to allocate and change the subscriber that is allowed to use mobile services at any given time.

According to a fourth aspect of the present invention there is provided apparatus for use within a mobile telecommunications network in order to manage bandwidth availability. The apparatus comprises a subscriber activity monitor for identifying periods of time during which subscribers have switched off one or more mobile services at their UEs, and a policy deployment unit for providing a policy deployment towards subscribers in dependence upon the length and number of such periods.

The subscriber activity monitor may be configured to receive and record, from UEs, timestamps indicating times at which associated UEs are switched on and off.

According to a fifth aspect of the present invention there is provided a computer program comprising computer readable code which, when run on a UE, causes the UE to behave as a UE according to the above first aspect of the present invention.

According to a sixth aspect of the present invention there is provided system managing bandwidth availability in a mobile telecommunications network. The system comprises apparatus for use within the mobile telecommunications network and comprising a subscriber activity monitor for identifying periods of time during which subscribers have switched off one or more mobile services at their UEs, and a policy deployment unit for providing a policy deployment towards subscribers in dependence upon the length and number of such periods. The system further comprises a multiplicity of UEs each comprising a controller unit for switching one or more mobile services on and off, a user interface unit configured to receive user inputs indicating that a user wants to turn the one or more mobile services on or off and for causing the controller unit to act accordingly, and a network signalling unit for identifying times at which the user switches the one or more mobile services on and off and for signalling those times to said apparatus within the mobile telecommunications network.

DETAILED DESCRIPTION

Figure 1:
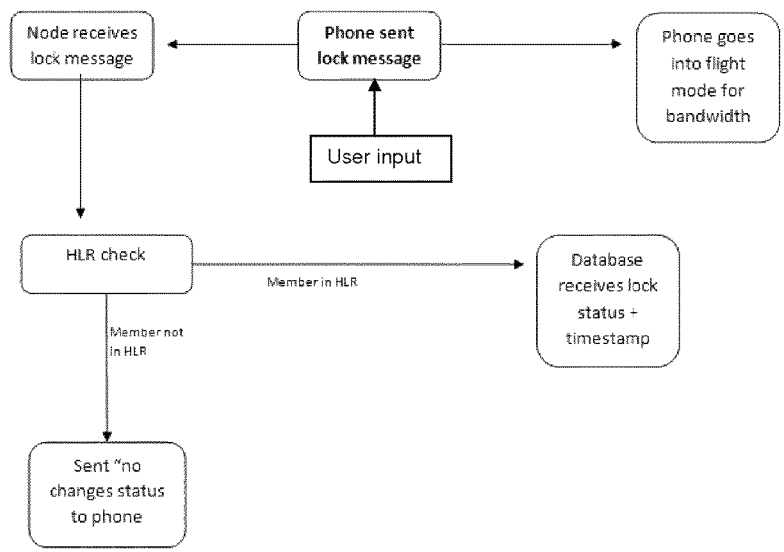
FIG. 1 is a block diagram, illustrating a UE lock usage process.

In view of the bandwidth related problems faced by mobile telecommunications network operators, including Public Land Mobile Network (PLMN) operators, it is desirable to implement a service that makes it easy for subscribers to switch off mobile data services when they are not actively using it and which incentivises them to do so. ["Mobile Data Services" is used here to define services used to send and receive data, where data is distinct from traditional telephony services including voice.] An incentive might be financial or otherwise. To achieve this, a service is proposed that is referred to hereinafter as the Bandwidth Release (BR) service. Typically, this service is implemented by installing one or more BR servers into the PLMN and which are configured to monitor user devices and update network records accordingly. BR is a service that makes it possible for subscribers to notify a network operator in substantially realtime that the subscribers are switching off mobile data, and that they are switching it back on, thus releasing bandwidth available for other users in the intervening periods. The introduction of BR may therefore reduce the need for network expansion and increase the efficiency of the existing networks. With the possibility to record the period that subscribers are not using any bandwidth the network operator can reward subscribers with, for example, enhanced services, discounts and the like, i.e. providing a "policy deployment" towards subscribers. As well as the already noted benefits, BR may also increase subscriber satisfaction as a result of such rewards, improving the "binding" between subscribers and network operators.

During a period of time when data services are unavailable to a subscriber, data for transmission including, for example emails, text messages, etc, may be added to a queue for sending when data services are reactivated.

Key to the BR service is the sending of trustworthy notifications from subscriber UEs to the mobile telecommunications network (hereinafter referred to, by way of example, as the "PLMN"). Although a number of different approaches may be used to achieve this, an exemplary approach described here involves the use of an appropriate application or "App" installed in the subscriber device or User Equipment (UE), where that device or UE is typically a smartphone. This App is configured such that it is able to turn on and off mobile data on the UE, e.g. by the user opening the App and checking and unchecking a UE data checkbox. Immediately when this checkbox is ticked, the App causes the UE to send a status update to the PLMN. This is typically sent to a server or other network node that is integrated into the operator's network (the node may, for example, be part of the operator's billing system). The status update includes a timestamp reliably generated by the App and identifying the time that mobile data was switched off. The timestamp is recorded at a database associated with the server. Conversely, when the subscriber un-checks the checkbox, mobile data is switched on again at the UE, and a new status update is sent to the server indicating the change of status and including a new timestamp. Again, the timestamp is recorded by the server in the database. During the period when mobile data is switched off at the UE, other PLMN services may remain switched on, e.g. voice call services.

From the data recorded in the database, the total amount of time for which mobile data was switched off at the UE can be calculated and notified to some further network or network node, e.g. within the operator's billing system. This might involve for example the web server generating a "bandwidth-release" Call Detail (or Data) Record (CDR) and sending this towards this further network or network node.

A related service can be offered to a network's subscribers that records when the subscribers enter and exit a geographical hotspot. Users may register for this service using an App installed on their UEs, or may otherwise use the App to interact with the service. The approach here is that a network operator (dynamically) defines a hotspot such as in and around a football stadium. When a match is being played in the stadium, timestamps will be sent from a subscriber's UE to the network when the subscriber enters or exits the stadium or its immediate vicinity. Subscribers will be rewarded based upon the amount of time they spend outside of the hotspot, or possibly for leaving when they are alerted (on their UEs) that the hotspot service is active.

Considering the UE App in more detail, a very simple implementation might involve, upon opening of the App on the UE, the display of a simple text line stating a currently available action and a current state, for example: "close the usage of bandwidth" and a checkbox.

Figure 2:
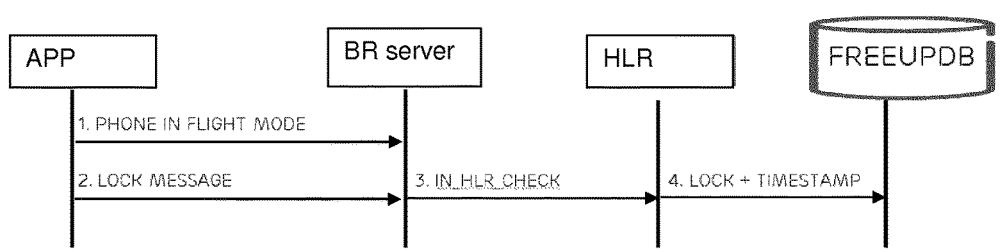
FIGS. 2 and 3 are signalling diagrams, illustrating high level signalling associated with the process of FIG. 1.
Figure 3:
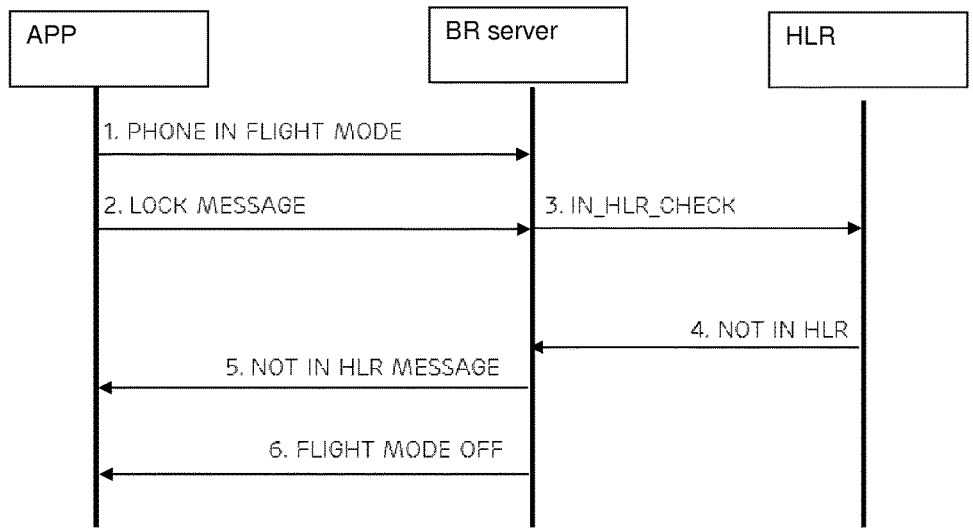

FIG. 1 illustrates a process for "locking" a mobile data service at a UE. This process is initiated by the UE sending a "lock message" to the BR server in the PLMN. At this point, the phone is configured to shut off mobile data (and possibly other services). The BR server receives the message including the switch-off timestamp and first checks the Home Location Register (HLR) or Home Subscriber System (HSS) to determine if the subscriber's UE is currently located in a PLMN cell to which the BR service applies. If yes, then the BR server records the received status and switch-off timestamp in a database. If not, the request is rejected by the BR server and the subscriber's UE notified (allowing it to switch mobile data service back on). High level signalling associated with this process in the case where the BR service is allowed is illustrated in FIG. 2. Signalling associated with the case where the service is rejected, because the subscriber's UE is not located in an appropriate PLMN cell, is illustrated in FIG. 3.

Figure 4:
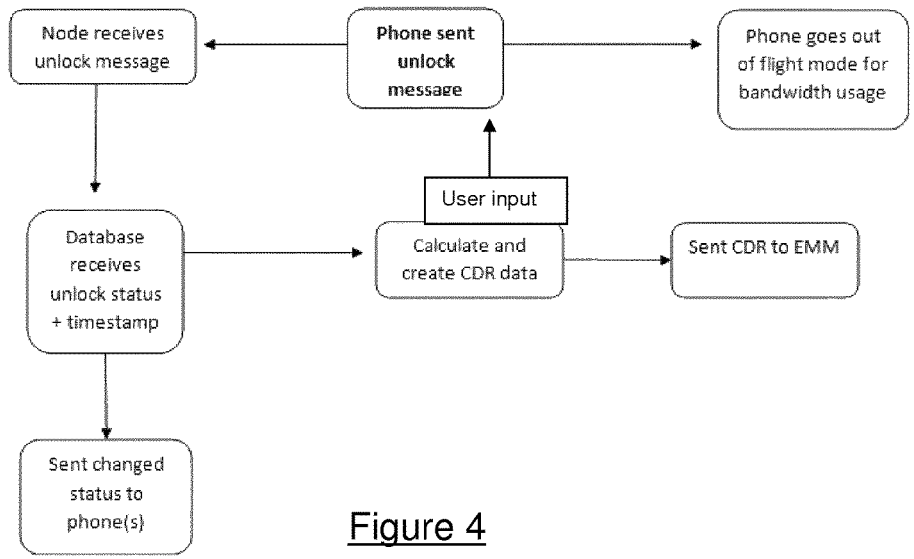
FIG. 4 is block diagram, illustrating a UE unlock usage process and associated PLMN CDR generation process.

FIG. 4 illustrates a process for "unlocking" a mobile data service at a UE. This process is initiated by the UE sending an "unlock message" to the BR server in the PLMN. At this point, the UE turns mobile data (and possibly other services) back on. The BR server receives the message including the switch-on timestamp and records the status and timestamp. In the database. A confirmation alert is returned to the phone. The BR server also uses the switch-off and switch-on timestamps to determine an incentive due to the subscriber. It then delivers this, by way of example, in a CDR record to some further node (depicted as "EMM" in the figures).

Figure 5:
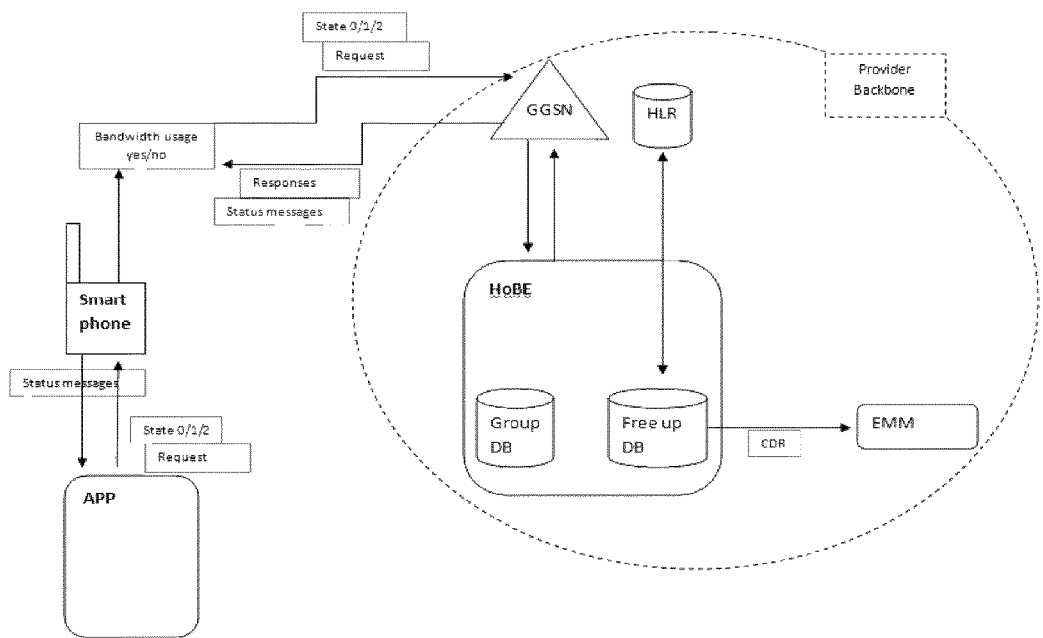
FIG. 5 is a block diagram, illustrating schematically a PLMN architecture implementing an improved subscriber bandwidth management process.

FIG. 5 illustrates schematically an architecture for implementing a somewhat more sophisticated scheme. The Figure illustrates a UE (smartphone) 1 having a BR app 2 installed on it. Within the PLMN, standard nodes including the GPRS Gateway Support Node (GGSN) 3 and Home Location Register (HLR) (or HSS) 4 are implemented, as well as other nodes not shown in the Figure. In order to allow for charging within the PLMN, and EMM node 5 is implemented. Shown in FIG. 1 is a new node referred to here as a BR server 6. The BR server 6 implements two databases (DBs) including a Group DB and a Free up DB. The BR server is described further below. FIG. 5 also shows various high level signalling exchanged between the UE 1 and the BR server 6 via the GGSN 3.

Figure 6:
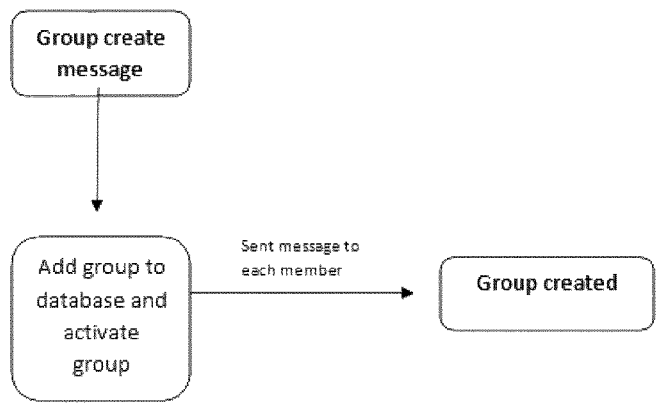
FIG. 6 is a block diagram, illustrating a process for adding a group to a Bandwidth Expansion service.
Figure 7:
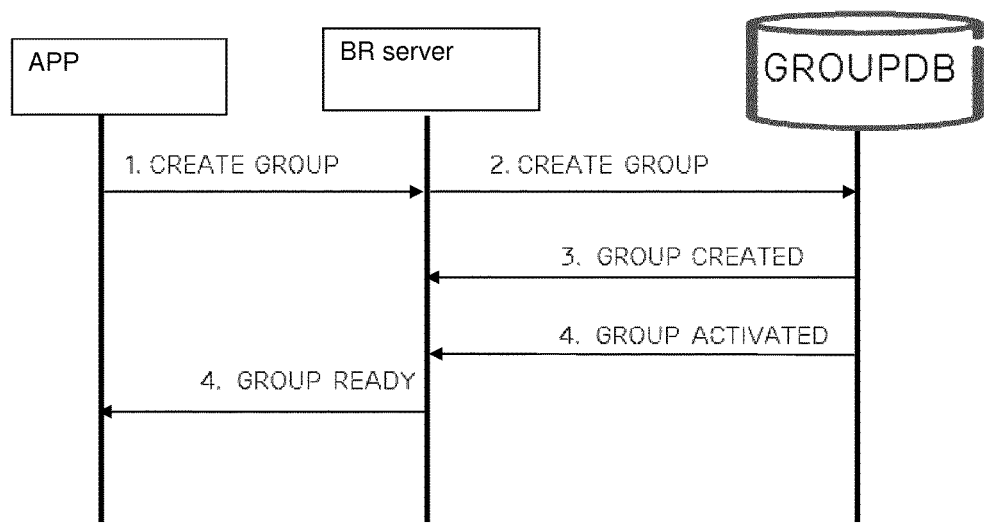
FIG. 7 is a signalling diagram, illustrating high level signalling associated with the process of FIG. 6.
Figure 8:
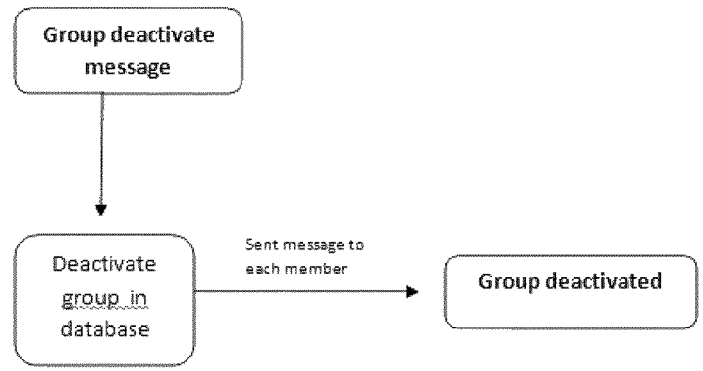
FIG. 8 is a block diagram, illustrating a process for deactivating a group associated with a Bandwidth Expansion service.
Figure 9:
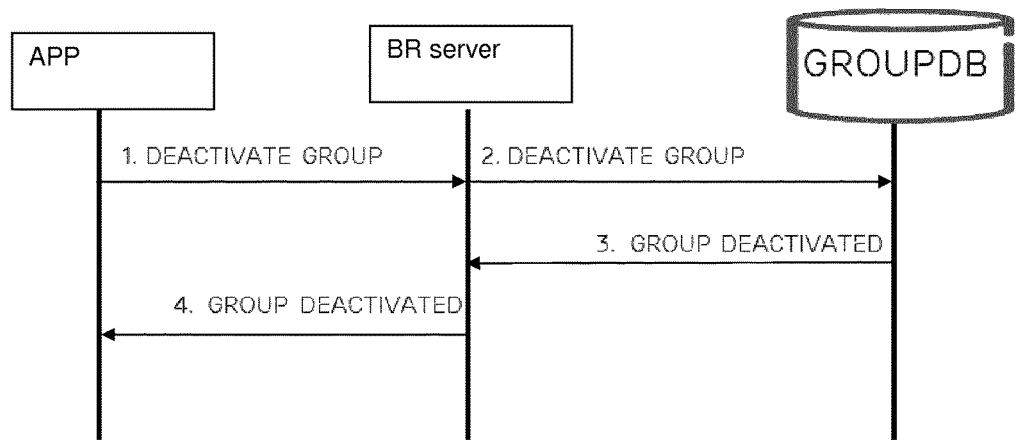
FIG. 9 signalling diagram, illustrating high level signalling associated with the process of FIG. 8.

The system illustrated in FIG. 5 relies upon the establishment and cooperation of groups of subscribers. The group creation process is illustrated schematically in FIG. 6, where the Group create message originates at one of the Group member's UE. FIG. 7 illustrates high level signalling that might be associated with this group creation process. FIG. 8 illustrates schematically the process for deactivating a group, e.g. where the Group deactivate message originates at one of the group member's UE. FIG. 9 illustrates high level signalling that might be associated with this group deactivation process.

For a bandwidth sharing group, some maximum size may be defined in order to better manage the service. For example, the maximum group size may be set to ten. Group members may be limited to subscribers held in respective subscriber address books although groups may be created in an ad hoc manner. Group creation may be initiated by a given subscriber sending a proposed group list to the BR server, with the BR server in turn sending invitations out to the other group members.

The proposal is to designate one subscriber, the group "leader", within a given group as having access to mobile data services. The other subscribers do not have access when they accept to join the service (of course they may opt out of the service at any time to reactivate their mobile data service but will loose the benefit of any incentive should they choose to do so). It is of course preferable, though not absolutely necessary, that group members of that are not currently the group leader do not piggyback on the data services available to the leader, e.g. by attaching to a personal hotspot established by the leader, as to do so would reduce the benefits of the group to the network operator.

In order to take over as leader, i.e. to acquire the data service connection, a group member's UE may temporarily reactivate mobile data and send a change of leader request to a coordinating server within the network. That request may be allowed or refused immediately, or placed in a queue. Such a request may cause an alert to be sent to the current leader asking for permission to change the leader. If the current leader accepts, the leader is changed immediately and the subscriber requesting the lead notified. If the current leader rejects the request, he or she may remain leader and the requesting subscriber notified of the refusal. In this latter case, some rules may be applied to prevent the current leader "hogging" the leader role. For example, this might allow the current leader to continue as leader for some specified time, e.g. 1 minute. An alternative scenario will reallocate the leadership role on a round robin basis, giving each group subscriber an equal chance to temporarily activate their mobile data service. This would allow the subscriber's UE to periodically perform background tasks, e.g. updating emails etc. A subscriber may request the leadership for a longer period, e.g. to download a web page.

Figure 10:
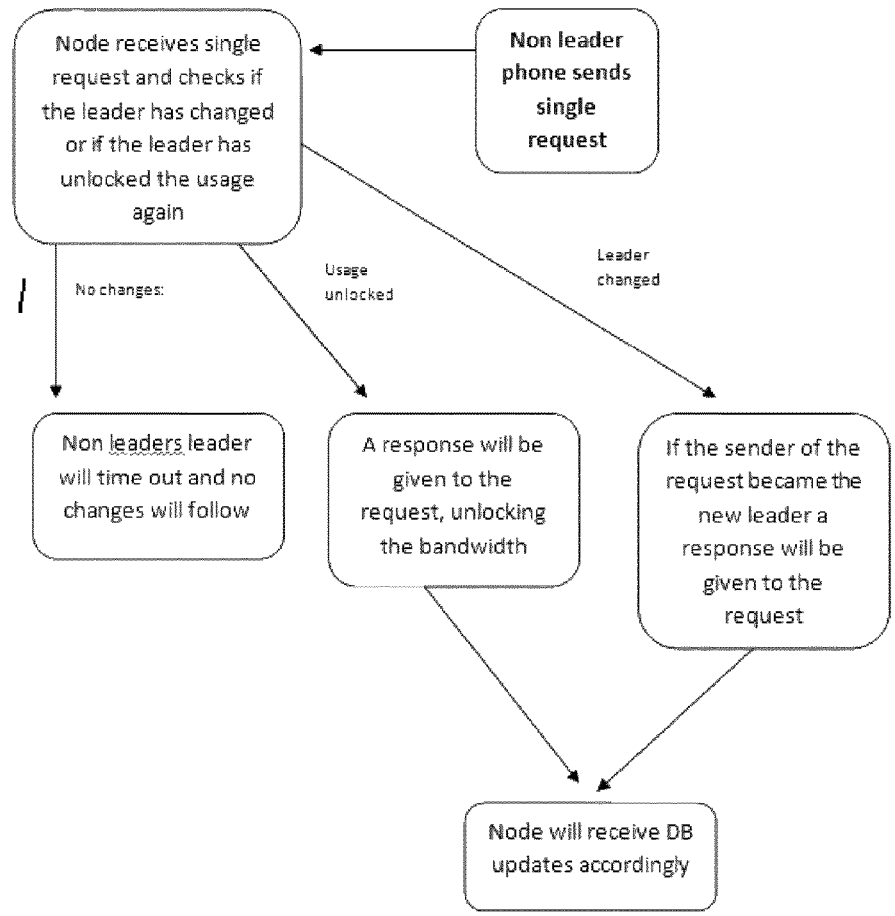
FIG. 10 is a block diagram, illustrating a process allowing mobile wireless devices to poll a network for access to mobile data services.
Figure 11:
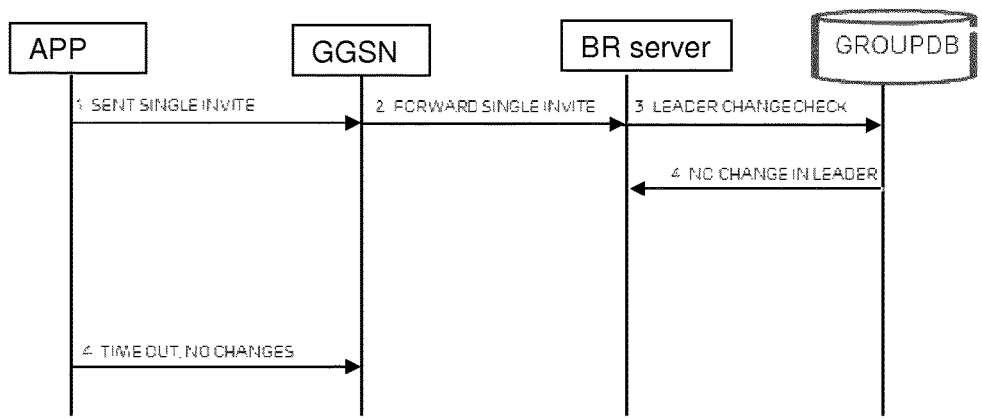
FIGS. 11 to 13 are signalling diagrams, illustrating high level signalling associated with the process of FIG. 10.
Figure 12:
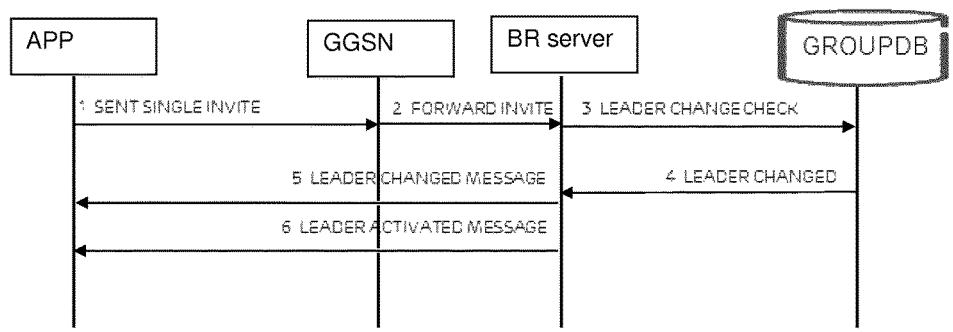

FIG. 10 illustrates a process whereby group members poll the BR server periodically in order to determine group leadership status. This poll message is referred to as a "single request" and will be a Packet Data Protocol (PDP) context attach message. Upon receipt of the request, the BR server determines if the leadership status has changed by contacting the Group DB. If not, no response is returned to the polling member and the request times out at that member's phone. This scenario is illustrated further by the high level signalling flow shown in FIG. 10. In the event that the Group DB indicates that the leader has changed to the polling member, the BR server notifies the polling member and the new leader will have the PDP Context attached and activated (the other members of the group will eventually be in time out and will only make another attempt to reactivate mobile data when the new period starts). That member now switches on mobile data services. The high level signalling flow associated with this scenario is illustrated in FIG. 11. A third scenario, illustrated in FIG. 12, is where the BR server determines that the leader has changed, but the new leader is not the polling member. In this case, the request again times out at the polling member and data services remain switched off for the member.

The App installed on the UE and corresponding network service operates as follows: The App when opened presents, via the UE's Graphical User Interface (GUI), a checkbox which can be either checked or unchecked:

Checked: The phone will issue a specific state, a first state indicated as e.g. a "1" for a regular subscriber or indicated as e.g. a "2" for a current group leader towards the network based BR server for administration purposes. Bandwidth will be freed by closing down usage of the bandwidth in particular for mobile data for the subscriber by closing the bandwidth connection on the network side or on the phone itself (going into flight mode for bandwidth consumers only).

Unchecked (default): Bandwidth can be used by the subscriber. The phone will issue the (default) state indicated as e.g. a "0".

In the event that a subscriber terminates the App, that will cause a message corresponding to a state 0 to be sent to by the App the BR server.

The App may also receive status information that it will display via the GUI. The following information might be received and displayed: "Disconnected, not using bandwidth", "Connected, using bandwidth", "Not in network of provider, No actions taken", "Leading". The user is able to make decisions regarding use of mobile data services based upon the received and displayed alerts.

When in group mode, it is possible that another group member will want to take over the group leadership and will choose this option in the App. This causes two PDP context attach messages in SGSN to be sent towards the BR server (shortly after each other (default: within 5 seconds)), requesting the BR server to contact the current group leader to request permission to transfer leadership. If the current leader does not respond, nothing further happens until a timeout at the BR server causes the node to inform the requesting member that the request was not accepted. If on the other hand the current leader responds positively to the BR server's request, the former leader changes its state to 1 and closes down its bandwidth consumption (PDP Context is de-activated). The BR server then attaches and activates the PDP Context for the requesting member, notifying the App on the new leader's UE that the leadership has changed. This causes the App to change its status to 2 and open the usage of bandwidth. This updated status above is also sent to the Group DB for administration purposes.

Figure 13:
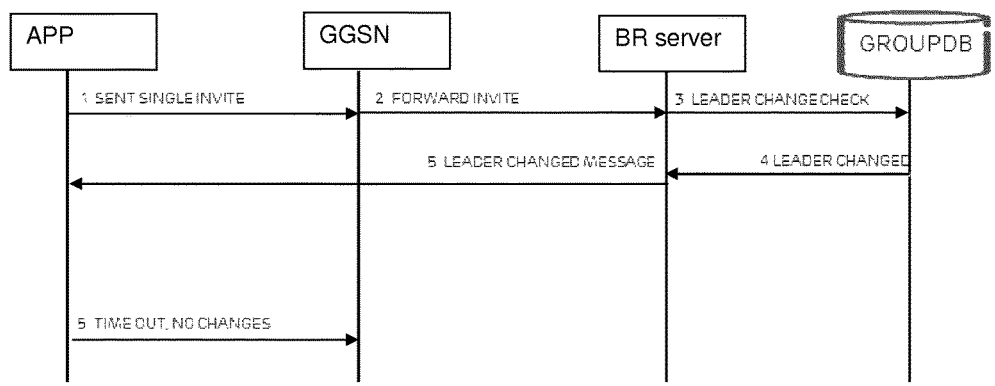
Figure 14:
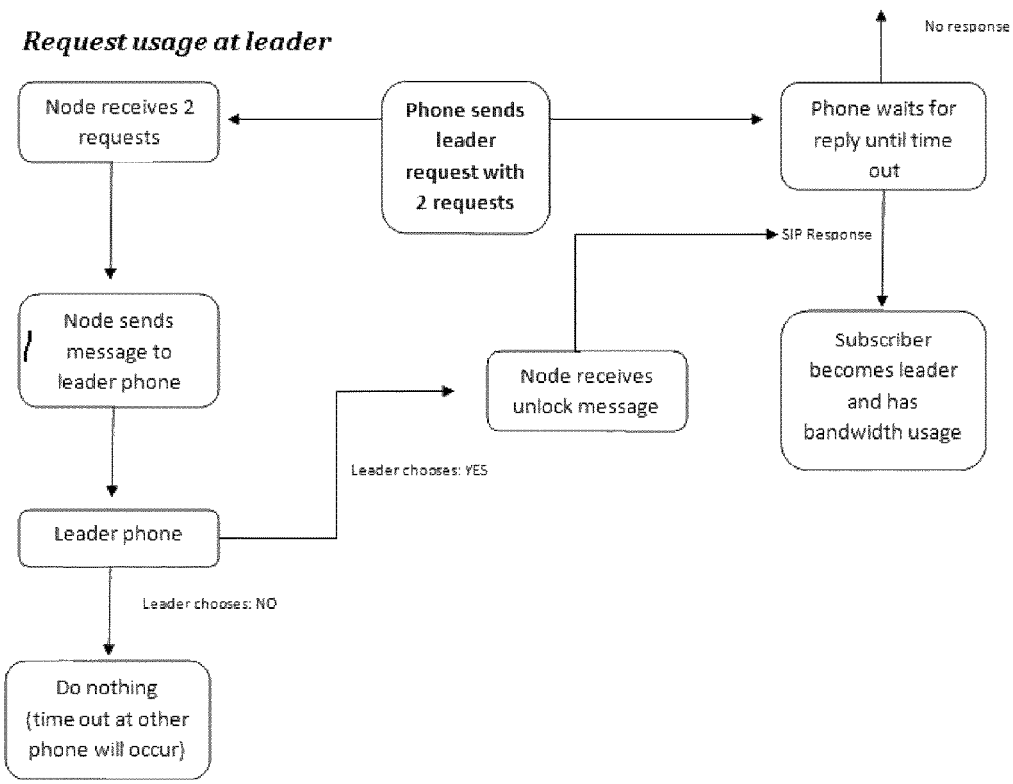
FIG. 14 is block diagram, illustrating a process for allowing a group member to request leadership of a BR service group.
Figure 15:
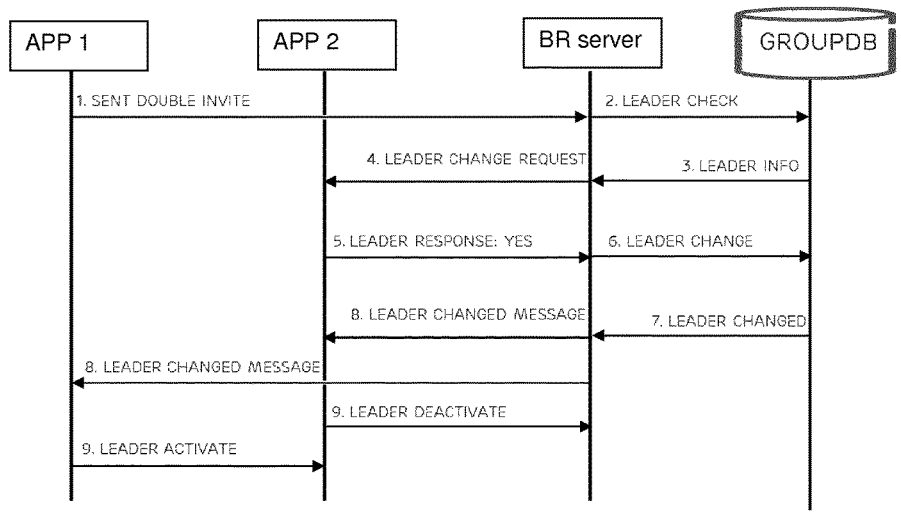
FIGS. 15 and 16 are signalling diagrams, illustrating high level signalling associated with the process of FIG. 14.

This process is further illustrated in FIG. 13. FIG. 14 illustrates high level signalling in the case that the current group leader accepts the change request, whilst FIG. 15 illustrates high level signalling in the case that the current group leader rejects the change request.

Figure 16:
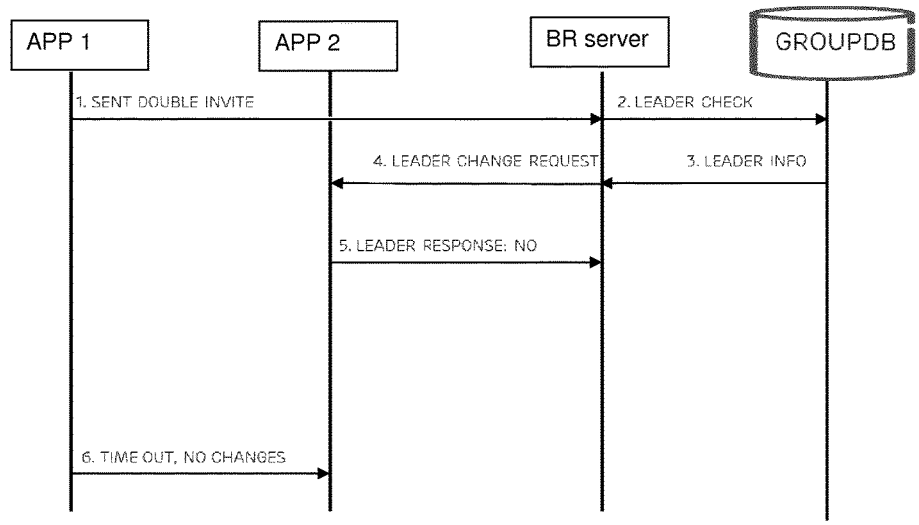
Figure 17:
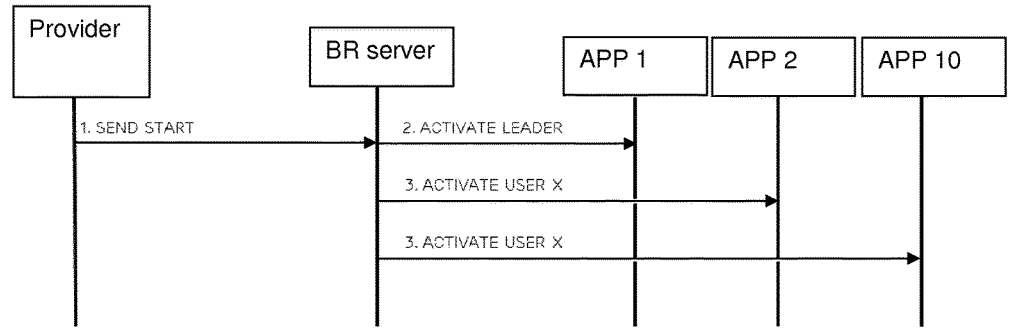
FIGS. 17 and 18 are signalling diagrams, illustrating high level signalling associated respectively with process for activating and deactivating a BR service for a service group.

FIGS. 16 and 17 illustrate high level signalling that might be used to alert group members to the availability and termination of a BR service.

Considering further the Free up database (DB) of FIG. 5, this DB stores the time stamps of all actions with the following information:

Closure_start: A timestamp that specifies the time when a subscriber started freeing up bandwidth.

Closure_end: A timestamp that identifies a time when a subscriber closed his freeing up of bandwidth.

Left_Provider: A timestamp that gives the moment the subscriber's UE left the HLR and with that the network of the provider and freed up the bandwidth automatically.

Lead_subscriber: Boolean if the subscriber is or is not the leader of the group.

Considering now the Group DB, this stores:
Group_ID: The ID of the group;
Phone number: The phone number of the subscribers;
Primary leader: The leader of the group (Default for first subscriber in the list)

Considering further the BR server, when this server receives a state 1 from a UE, a closure_start timestamp will be added to the free up DB. The BR will additionally check, at regular intervals (e.g. every 2 minutes) in the HLR to make sure the subscriber's UE is still available in the providers HLR. As long as the subscriber's UE is available in the HLR, the subscriber is freeing up bandwidth (otherwise the phone is switched off, or in another provider's network and with that, not using the provider's bandwidth in any case) and the status recorded in the Free up DB remains unchanged. If however the HLR check indicates that the subscriber's UE is no longer recorded in the HLR, a left_provider timestamp is added to the Free up DB. If this subscriber is a member of a currently active group and is the current leader of that group, the second member in the group list is designated as leader and appropriate actions taken to activate mobile data services for that new leader.

When a message indicating state 0 is received by the BR server from a subscriber's UE, indicating that the bandwidth connection has been started on the subscriber's UE, the BR server adds a closure_end timestamp to the Free up DB.

When the BR server sends either a closure_end or left_provider status message to the Free up DB, the BR server calculates the total time that the relevant subscriber spent on the network with mobile data services actively switched off. This information, together with the subscriber details (phone number) and leader value, can be used to create a CDR that is sent to the EMM. This CDR might identify some specific benefit, e.g. it might result in some "bonus" link being sent to the subscriber's UE allowing him or her to access a service, or might identify some financial reward. The BR server will also send a notification message to the subscriber's UE indicating the new status.

Figure 18:
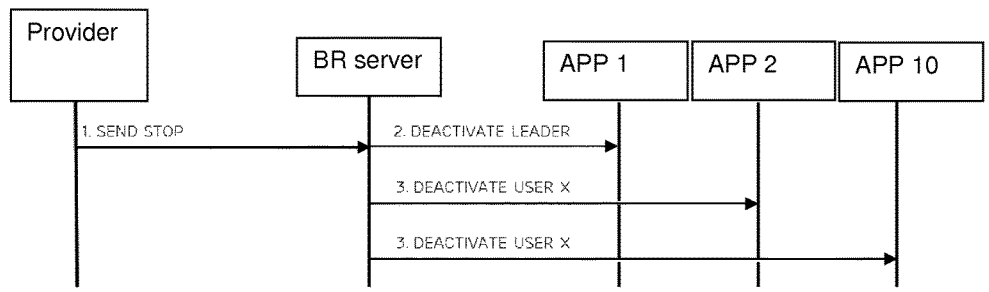

FIG. 18 illustrates schematically a mobile wireless UE, for example a smartphone, configured to participate in the BR services described above. The UE comprises a user interface unit 1 that may comprise, for example, a touch sensitive display screen implementing a graphical user interface (GUI). The UE also comprises a standard radio interface 2, e.g. a 3G or LTE interface, comprising a transmitter and receiver. The radio interface and UE configuration enable the UE and its user to access mobile data services. The UE is further provided with a controller unit 3 for switching one or more mobile services on and off. By means of the user interface unit 1, a user is able to cause the controller unit 3 to turn one or more mobile services on or off. A network signalling unit 4 cooperates with a timestamp generator 5 to identify times at which the user switches the one or more mobile services on and off to signal those times to an entity within or connected to the mobile telecommunications network. The timestamp generator 5 may be configured to prevent the user from changing the clock used to generate the timestamps, i.e. to allow the network operator to trust the timestamps. It will of course be appreciated that the mobile wireless UE will be implemented using a combination of hardware, including processors, memories, etc, and software code stored on memory.

Figure 19:
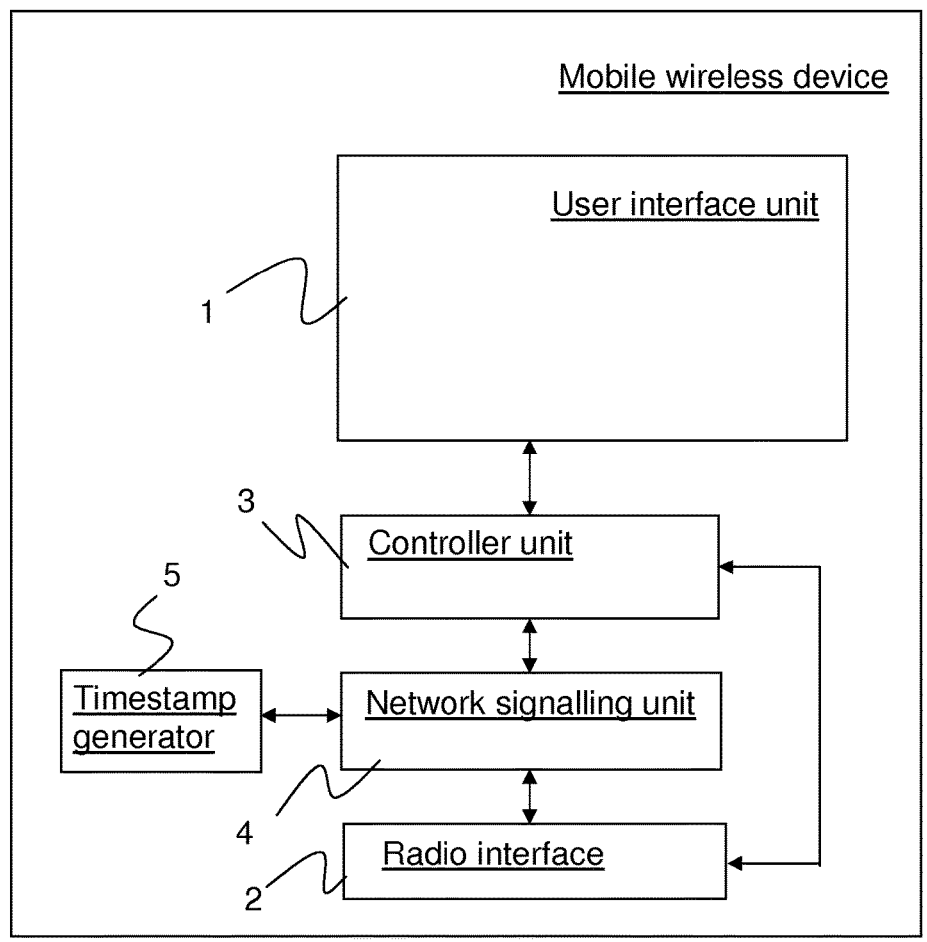
FIG. 19 is a block diagram, illustrating schematically a UE configured to implement a BR service.

FIG. 19 illustrates schematically a BR server for implementing the BR service on the network side. The node is couple via appropriate interfaces to the Free up and Group databases (DBs), and comprises a subscriber activity monitor 10 for identifying periods of time during which subscribers have switched off one or more mobile services at their mobile wireless UEs. This employs of course an appropriate interface towards the mobile UEs. The node further comprises a policy deployment unit 11 for providing a policy deployment towards subscribers in dependence upon the length and number of such periods. This might comprise, for example, an interface towards the EMM, the policy deployment unit 11 being configured to send CDRs to the EEM as described above. Again, the BR server will be implemented using a combination of hardware, including processors, memories, etc, and software code stored on memory.

Figure 20:
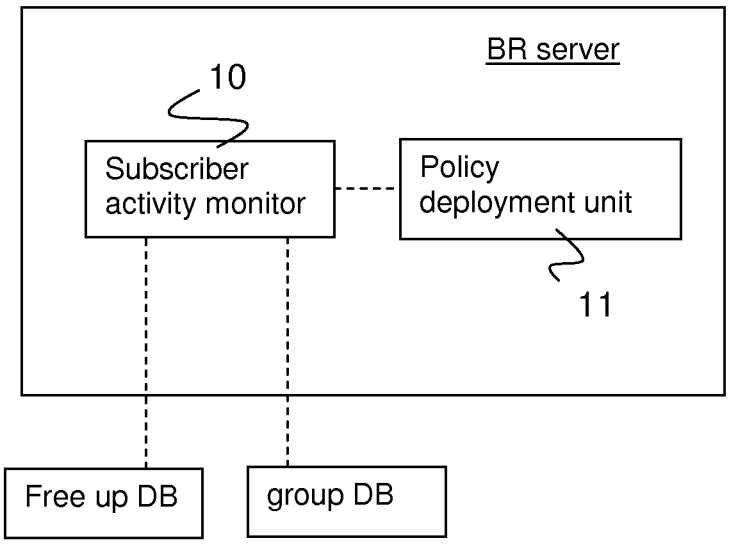
FIG. 20 is a block diagram, illustrating schematically a network node configured to implement a BR service.

FIG. 20 is a flow diagram illustrating a method of operating a mobile wireless UE such as that illustrated in FIG. 18. The method comprises receiving (S1) user inputs via a user interface indicating that a user wants to turn one or more mobile services on and off, and switching (S2) the one or more mobile services on and off in accordance with received user inputs. The method further comprises identifying (S3) times at which the user switches the one or more mobile data services on and off and signalling those times to an entity within or connected to said mobile telecommunications network.

Figure 21:
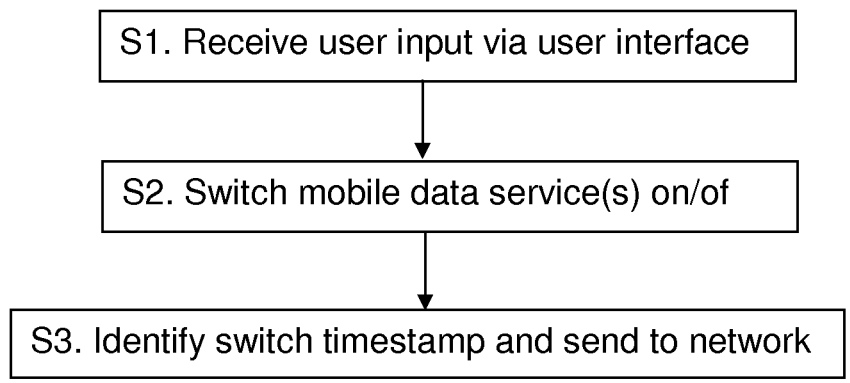
FIG. 21 is a flow diagram illustrating a process carried out at the UE.
Figure 22:
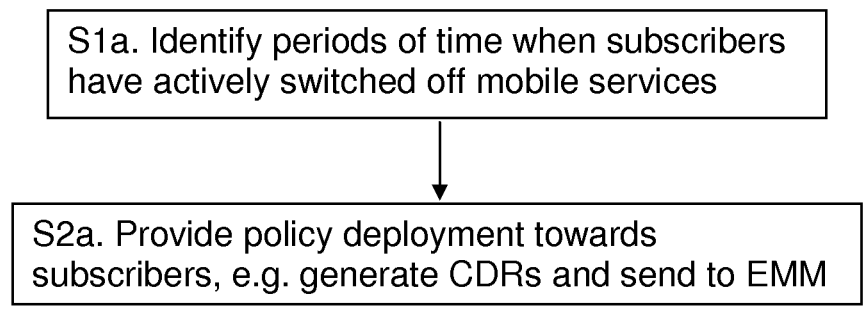
FIG. 22 is a flow diagram illustrating a process carried out at the network node.

FIG. 21 is a flow diagram illustrating a method of managing bandwidth availability in a mobile telecommunications network. This method may be carried out in the network (BR) node of FIG. 20, and comprises identifying (S1a) periods of time during which subscribers have actively switched off one or more mobile services at their mobile wireless UEs, and providing (S2a) a policy deployment towards subscribers in dependence upon the length and number of such periods.

By applying the system, method and UE as elucidated above the subscriber of an operator is enabled to actively cooperate in maintaining available bandwidth in a simple way.

It is regarded an advantage that by application of the system, method and UE bandwidth issues causes by overloaded network capacity are prevented, and do not force an operator to invest and install additional network capacity such as Basestations to prevent a congested access network, perceived as a poor service level.

Especially network equipment investment in "hotspot" areas, such as in football stadia where during a small amount of time only a substantial amount of bandwidth is required, could be minimized, resulting in savings of material and environment.

It will be appreciated by the person of skill in the art that various modifications may be made to the above described embodiments without departing from the scope of the invention.

The invention claimed is:

1. A mobile wireless device for use with a mobile telecommunications network, wherein the mobile wireless device is configured to be a member of a group of mobile wireless devices sharing a mobile service in which only one member of the group is entitled to control the use of the mobile service at any given time, the mobile wireless device comprising:
a controller circuit configured to:
switch the mobile service on or off responsive to user inputs indicating that a user wants to turn the mobile service on or off; and
when the mobile service is switched off, relinquish control over the use of the mobile service to another mobile wireless device in the group; and
a network signaling circuit configured to:
identify a time at which the user switches the mobile service off at the mobile wireless device; and
signal the time to an entity within or connected to the mobile telecommunications network indicating to the entity that the mobile wireless device is relinquishing the control to another member of the group at the signaled time; and
a user interface circuit configured to:
receive the user inputs indicating that a user wants to turn the mobile service on or off; and
send, to another member of the group, a change request requesting to control use of the mobile service, wherein the sending the change request is after switching the mobile service off.

2. The mobile wireless device of claim 1, wherein the mobile service is a mobile data service.

3. The mobile wireless device of claim 2, wherein the controller circuit is configured to switch the mobile data service on and off by activating and deactivating a Packet Data Protocol (PDP) context with the mobile telecommunications network.

4. The mobile wireless device of claim 1:
wherein the user interface circuit is a graphical user interface;
wherein the network signaling circuit is configured to receive, from the mobile telecommunications network, a notification that a bandwidth release service is available; and
wherein the controller circuit is configured to respond to receipt of the notification by causing the graphical user interface to display user selectable options to turn mobile services on and off.

5. A method of operating a mobile wireless device for use with a mobile telecommunications network, wherein the mobile wireless device is a member of a group of mobile wireless devices sharing a mobile service in which only one member of the group is entitled to control the use of the mobile service at any given time, the method comprising:

receiving user inputs via a user interface indicating that a user wants to turn the mobile service on or off;

switching the mobile service off in accordance with a received user input and identifying a time at which the user switches the mobile service off at the mobile wireless device;

responsive to switching the mobile service off:
relinquishing control over the use of the mobile service to another wireless control device in the group; and
signaling the time to an entity within or connected to the mobile telecommunications network indicating to the entity that the mobile wireless device is relinquishing the control to another member of the group at the signaled time; and
sending, to another member of the group, a change request requesting to control use of the mobile service, wherein the sending the change request is after switching the mobile service off.

6. The method of claim 5, wherein the mobile service is a mobile data service.

7. The method of claim 6, wherein the switching mobile data service off comprises activating and deactivating a Packet Data Protocol (PDP) context.

8. The method of claim 5, wherein the method further comprises the mobile wireless device switching the mobile service on only if the change request is granted.

9. A computer program product stored in a non-transitory computer readable medium for controlling a mobile wireless device for use with a mobile telecommunications network, wherein the mobile wireless device is a member of a group of mobile wireless devices sharing a mobile service in which only one member of the group is entitled to control the use of the mobile service at any given time, the computer program product comprising software instructions which, when run on one or more processing circuits of the mobile wireless device, causes the mobile wireless device to:

receive user inputs via a user interface indicating that a user wants to turn the mobile service on or off;

switch the mobile service off in accordance with a received user input and identify a time at which the user switches the mobile service off at the mobile wireless device; and responsive to switching the mobile service off:
relinquish control over the use of the mobile service to another wireless control device in the group; and
signal the time to an entity within or connected to the mobile telecommunications network indicating to the entity that the mobile wireless device is relinquishing the control to another member of the group at the signaled time; and
send, after switching the mobile service off, a change request to another member of the group requesting to control use of the mobile service.

* * * * *